G. MILLER.
Hay-Elevator.

No. 209,703.  Patented Nov. 5, 1878.

WITNESSES
F. L. Ouraud
J. J. McCarthy

INVENTOR
George Miller
Alexander Mason
By his Attorneys

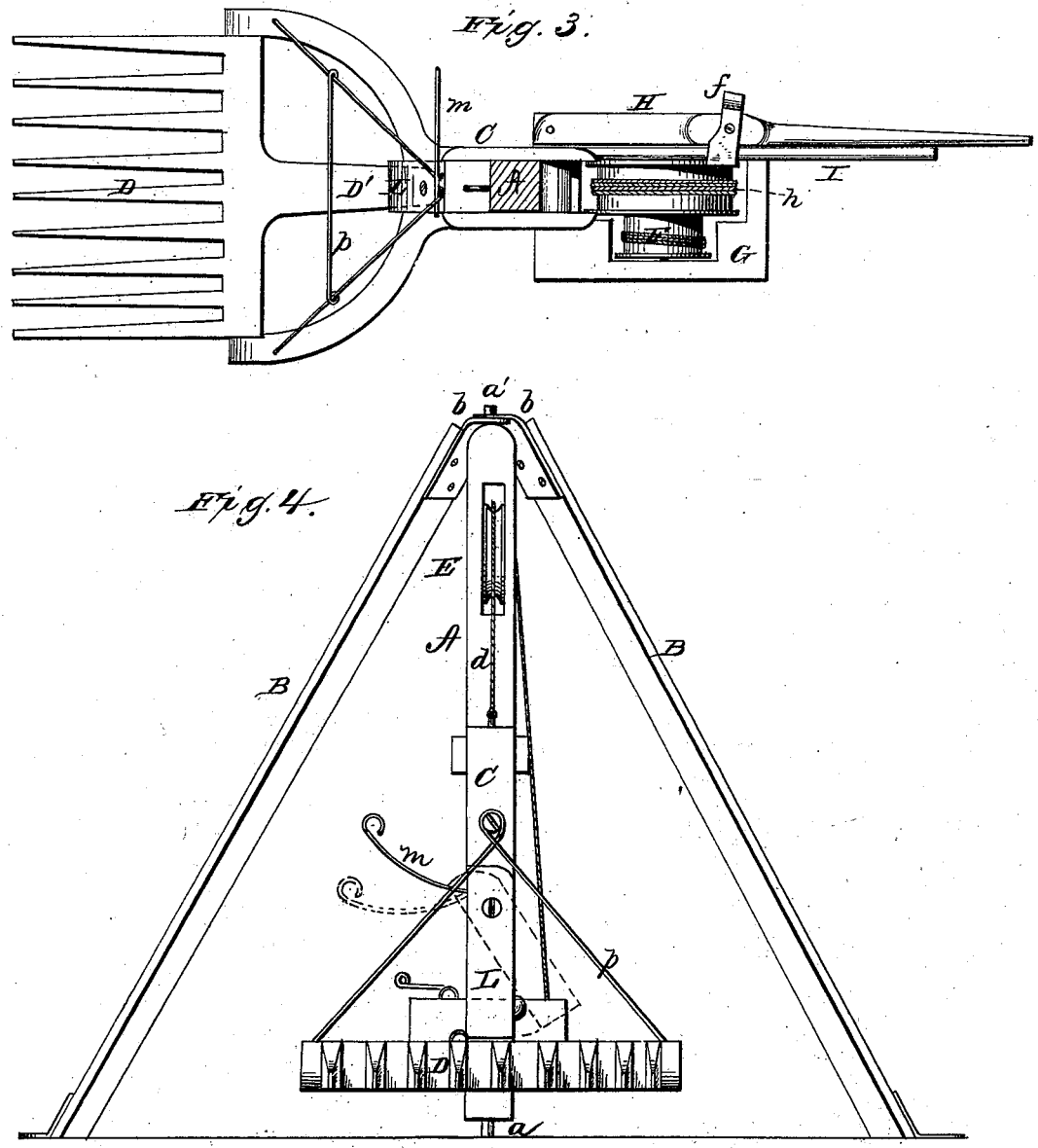

UNITED STATES PATENT OFFICE.

GEORGE MILLER, OF SALISBURY, MISSOURI.

IMPROVEMENT IN HAY-ELEVATORS.

Specification forming part of Letters Patent No. 209,703, dated November 5, 1878; application filed September 7, 1878.

*To all whom it may concern:*

Be it known that I, GEORGE MILLER, of Salisbury, in the county of Chariton, and in the State of Missouri, have invented certain new and useful Improvements in Hay-Elevators; and do hereby declare that the following is a full, clear, and exact description thereof, reference being had to the accompanying drawings, and to the letters of reference marked thereon, making a part of this specification.

The nature of my invention consists in the construction and arrangement of a hay-elevator, as will be hereinafter more fully set forth.

In order to enable others skilled in the art to which my invention appertains to make and use the same, I will now proceed to describe its construction and operation, referring to the annexed drawings, in which—

Figure 1:
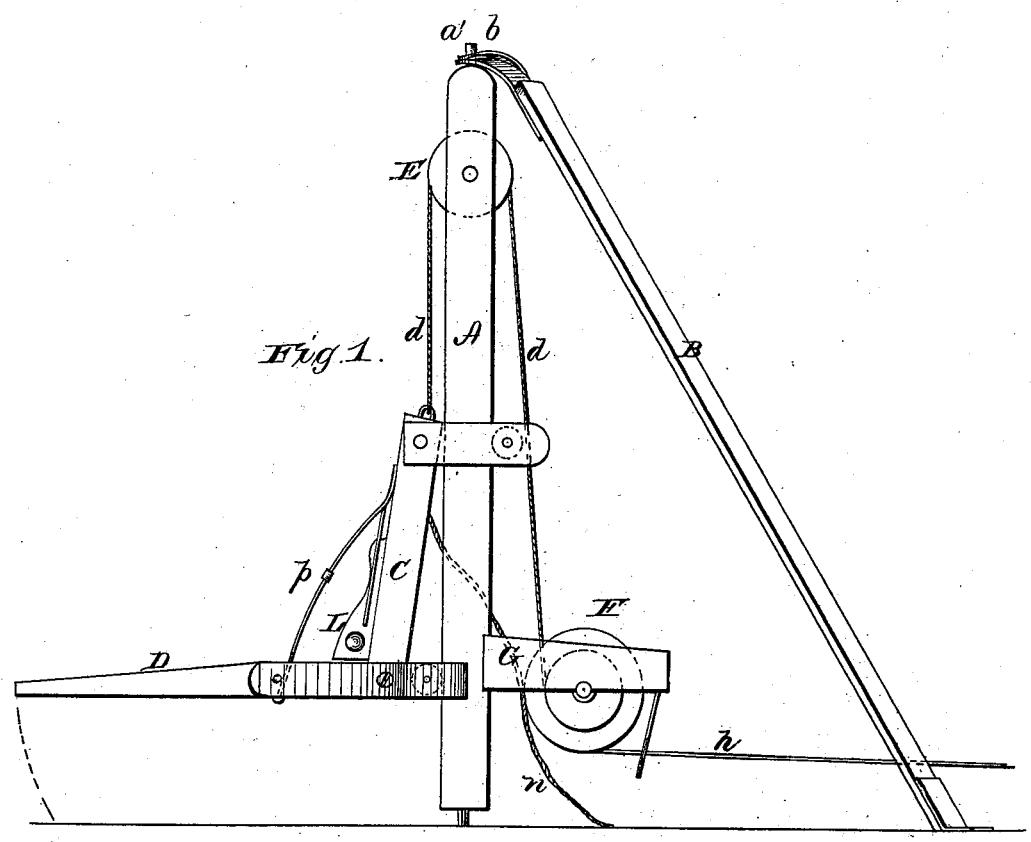
Figure 2:
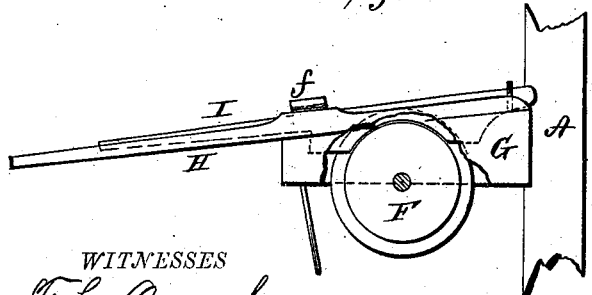

Figure 1 is a side elevation of my hay-elevator. Fig. 2 is a detailed view, showing the brake. Fig. 3 is a horizontal section, and Fig. 4 a front view, of the elevator.

A represents an upright post, having a pin, $a$, at its lower end to enter the ground. In the upper end of the post is a similar pin, $a'$, which is passed through straps $b\ b$ attached to the upper ends of two inclined bars or braces, B B. The lower ends of these braces are to be firmly secured to the ground, the whole thus forming a derrick having a vertical post capable of rotation and only two supporting-braces.

On the post A slides a frame, C, in which the fork D is hinged or pivoted. This frame is operated by means of a rope or chain, $d$, attached to its upper end and passing upward over a pulley, E, in the top of the post, then downward to and around a drum, F, mounted in a frame, G, which is attached to the post. The drum F is made double, having a larger and a smaller portion. The rope or chain $d$ is attached to the smaller portion, while to the larger portion is attached the operating-rope $h$. This latter rope has the power attached to it, and by pulling the same the drum is rotated so as to wind up the rope $d$, and thus raise the frame C with the fork D. The frame C descends of its own weight, reversing the pulley and winding up the cord $h$, the descent of said frame C being regulated by a brake, I, acting upon the pulley F.

To the frame G is attached a lever, H, by the use of which the post A is turned to either side, as required. This lever has a button or latch, $f$, for locking the brake I, as shown.

The fork D has a handle or stem, D', extending inward, and over the same drops a latch, L, to hold the fork in a horizontal position. This latch is provided with a lever, $m$, and trip-rope $n$ for turning it to one side, when the fork will drop and discharge the load.

A wire frame, $p$, is attached to the sliding frame C to stop the fork at the proper angle when tripping.

Having thus fully described my invention, what I claim as new, and desire to secure by Letters Patent, is—

1. The double pulley F, with ropes $d\ h$, and brake I, in combination with the sliding frame C, with fork D, post A, and pulley E, substantially as and for the purposes herein set forth.

2. The combination of the frame C, pivoted fork D, latch L, and wire frame $p$, substantially as and for the purposes herein set forth.

In testimony that I claim the foregoing I have hereunto set my hand this 7th day of August, 1878.

GEORGE MILLER.

Witnesses:
 H. C. MINTER,
 ANDREW W. TAYLOR.